US011936125B2

(12) United States Patent
Sudo

(10) Patent No.: US 11,936,125 B2
(45) Date of Patent: Mar. 19, 2024

(54) ANTENNA MODULE AND COMMUNICATION DEVICE EQUIPPED WITH THE SAME

(71) Applicant: Murata Manufacturing Co., Ltd., Nagaokakyo (JP)

(72) Inventor: Kaoru Sudo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 245 days.

(21) Appl. No.: 17/507,843

(22) Filed: Oct. 22, 2021

(65) Prior Publication Data

US 2022/0045428 A1 Feb. 10, 2022

Related U.S. Application Data

(63) Continuation of application No. PCT/JP2020/007307, filed on Feb. 25, 2020.

(30) Foreign Application Priority Data

Apr. 24, 2019 (JP) ................................ 2019-082696

(51) Int. Cl.
*H01Q 9/04* (2006.01)
*H01Q 5/328* (2015.01)
*H01Q 9/28* (2006.01)

(52) U.S. Cl.
CPC .......... *H01Q 9/0457* (2013.01); *H01Q 5/328* (2015.01); *H01Q 9/285* (2013.01)

(58) Field of Classification Search
CPC ...... H01Q 1/38–52; H01Q 5/30; H01Q 5/328; H01Q 5/378–392; H01Q 9/0407–0421; H01Q 9/0457; H01Q 21/065
See application file for complete search history.

(56) References Cited

U.S. PATENT DOCUMENTS

| | | | | |
|---|---|---|---|---|
| 10,651,555 B2 * | 5/2020 | Paulotto | H01Q 5/392 |
| 10,992,057 B2 * | 4/2021 | Avser | H01Q 21/065 |
| 2015/0194730 A1 * | 7/2015 | Sudo | H01Q 5/378 343/905 |
| 2019/0319364 A1 * | 10/2019 | Yang | H01Q 19/005 |

FOREIGN PATENT DOCUMENTS

| | | |
|---|---|---|
| CN | 104662737 A | 5/2015 |
| WO | 2014/045966 A1 | 3/2014 |
| WO | 2018/074377 A1 | 4/2018 |

OTHER PUBLICATIONS

International Search Report and Written Opinion dated Jun. 9, 2020, received for PCT Application PCT/JP2020/007307, Filed on Feb. 25, 2020, 9 pages including English Translation.
Office Action dated Sep. 12, 2023 in Chinese Patent Application No. 202080030968.2, 11 pages.

* cited by examiner

*Primary Examiner* — Hasan Islam
(74) *Attorney, Agent, or Firm* — XSENSUS LLP

(57) ABSTRACT

An antenna module includes a ground electrode, a fed element, unfed elements, and feed lines. The unfed element is formed in a planar shape and disposed facing the ground electrode. The fed element is formed in a planar shape and disposed between the unfed element and the ground electrode. The unfed element is formed in a planar shape and disposed between the fed element and the ground electrode. The feed lines extend through the unfed element and are used to transfer radio-frequency signals to the fed element.

15 Claims, 7 Drawing Sheets

ANTENNA MODULE AND COMMUNICATION DEVICE EQUIPPED WITH THE SAME

CROSS-REFERENCE TO RELATED APPLICATIONS

The present application is a continuation of and claims priority to PCT/JP2020/007307, filed Feb. 25, 2020, which claims priority to JP 2019-082696, filed Apr. 24, 2019, the entire contents of each are incorporated herein by its reference.

TECHNICAL FIELD

The present disclosure relates to an antenna module and a communication device equipped with the antenna module and more particularly relates to a technology for improving antenna characteristics of a multiband antenna module.

BACKGROUND ART

International Publication No. 2014/045966 (Patent Document 1) discloses a stacked patch antenna formed by stacking a fed element and an unfed element. In the antenna disclosed in International Publication No. 2014/045966 (Patent Document 1), the unfed element is formed in a cruciform shape by two crossing patches. Feed lines for feeding power to correspond to the patches are coupled to the fed element. Such a configuration enables the fed element to emit differently polarized radio waves. Because the unfed element is formed in a cruciform shape, the antenna can match a wider frequency band.

CITATION LIST

Patent Document

Patent Document 1: International Publication No. 2014/045966

SUMMARY

Technical Problem

In recent years, portable terminals such as smartphones has become widely used, and additionally, due to technological innovations such as the Internet of things (IoT), home appliances and electronic devices having wireless communication functionality have also been increasing. As a result, there is a concern that the level of communication traffic in wireless networks may be increased, and communication speeds and communication quality can be accordingly degraded.

As a solution to this problem, the fifth generation (5G) cellular communication systems have been developed. The 5G systems achieves advanced beam forming and spatial multiplexing by using a plurality of fed elements. In addition to signals at frequencies in the 6 GHz band, which has been used in previous technologies, the 5G systems use signals in millimeter-wave bands (several ten GHz frequencies) higher than the 6 GHz band. As such, the 5G systems aim to speed up communications and improve communication quality.

The 5G systems in some cases use a plurality of millimeter-wave bands in different frequency bands. In these cases, it is necessary to transmit and receive signals in the plurality of frequency bands by using a single antenna. For beam forming, the plurality of fed elements need to be formed in an array. But at the same time, the antenna is required to be compact for smaller and thinner portable terminals.

The present disclosure has been made to address such problems, and an object thereof is to provide a compact antenna module capable of transmitting and receiving radio-frequency signals in a plurality of frequency bands.

Solution to Problem

An antenna module according to the present disclosure includes a first ground electrode, a fed element, first and second unfed elements, and a first feed line. The first unfed element is formed in a plate-like shape. The first unfed element is disposed facing the first ground electrode. The fed element is formed in a plate-like shape. The fed element is disposed between the first unfed element and the first ground electrode. The second unfed element is formed in a plate-like shape. The second unfed element is disposed between the fed element and the first ground electrode. The first feed line extends through the second unfed element. The first feed line is used to transfer a radio-frequency signal to the fed element.

Advantageous Effects

In the antenna module according to the present disclosure, the first unfed element, the fed element, and the second unfed element, which serve as radiating elements, are disposed in the order presented. The feed line extends through the second unfed element and is connected to the fed element. With this structure, the fed element and the second unfed element can emit radio-frequency signals in different frequency bands. Furthermore, the first unfed element can expand the transmittable and receivable frequency bandwidth, and as a result, the antenna module can be downsized.

DESCRIPTION OF EMBODIMENTS

Figure 1:
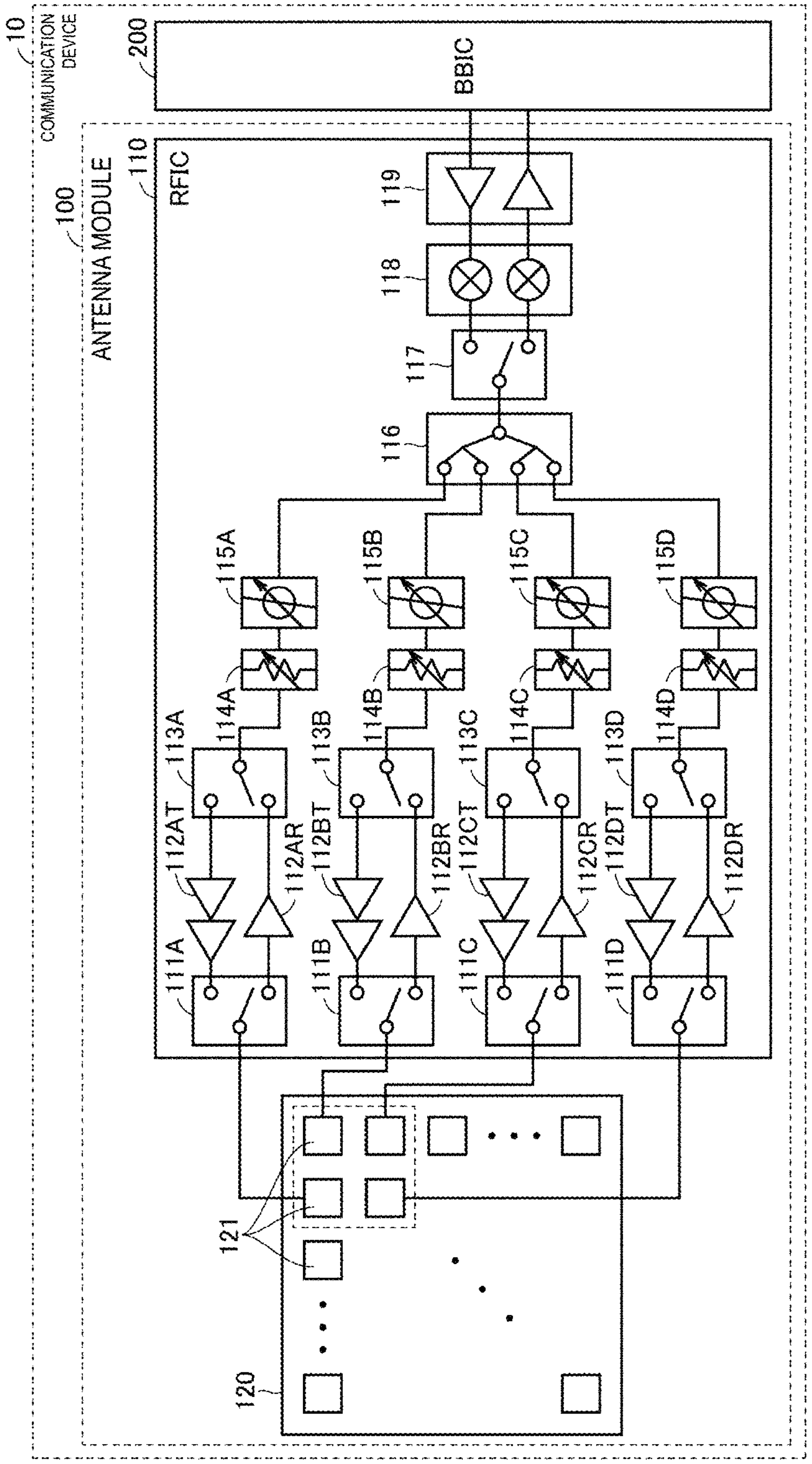
FIG. 1 is an example of a block diagram of a communication device using an antenna module according to a first embodiment.

Hereinafter, embodiments of the present disclosure will be described in detail with reference to the drawings. Identical or corresponding portions in the drawings are assigned identical reference characters, and descriptions thereof are not repeated.

First Embodiment (Basic Configuration of Communication Device)

FIG. 1 is an example of a block diagram of a communication device 10 using an antenna module 100 according to a first embodiment. Examples of the communication device 10 include portable terminals such as a mobile phone, a smartphone, and a tablet computer, and a personal computer having communication functionality. An example of frequency bands of radio waves used for the antenna module 100 according to the present embodiment is radio waves in millimeter-wave bands with center frequencies including 28 GHz, 39 GHz, and 60 GHz, but radio waves in frequency bands other than this example can also be used.

Referring to FIG. 1, the communication device 10 includes the antenna module 100 and a baseband integrated circuit (BBIC) 200 forming a baseband-signal processing circuit. The antenna module 100 includes a radio-frequency integrated circuit (RFIC) 110, which is an example of a feed circuit, and an antenna device 120. In the communication device 10, a signal is transferred from the BBIC 200 to the antenna module 100, up-converted into a radio-frequency signal, and emitted from the antenna device 120; and a radio-frequency signal is received by the antenna device 120, down-converted, and processed by the BBIC 200.

For ease of description, FIG. 1 illustrates only configurations corresponding to four fed elements 121 out of a plurality of fed elements 121 constituting the antenna device 120. Configurations corresponding to the other fed elements 121 having the same configuration are omitted. FIG. 1 illustrates an example in which the antenna device 120 is constituted by the plurality of fed elements 121 arranged in a two-dimensional array, but the antenna device 120 is not necessarily constituted by a plurality of fed elements 121 but may be constituted by a single fed element 121. Alternatively, the plurality of fed elements 121 may be arranged in a line as a one-dimensional array. In the present embodiment, the fed element 121 is a patch antenna formed as a substantially square plate.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner and splitter 116, a mixer 118, and an amplifier circuit 119.

When a radio-frequency signal is transmitted, the switches 111A to 111D and 113A to 113D are switched to establish connection to the power amplifiers 112AT to 112DT, and the switch 117 establishes connection to a transmit amplifier of the amplifier circuit 119. When a radio-frequency signal is received, the switches 111A to 111D and 113A to 113D are switched to establish connection to the low-noise amplifiers 112AR to 112DR, and the switch 117 establishes connection to a receive amplifier of the amplifier circuit 119.

A signal transferred from the BBIC 200 is amplified by the amplifier circuit 119 and up-converted by the mixer 118. The up-converted transmit signal, which is a radio-frequency signal, is split into four signals by the signal combiner and splitter 116. The four signals pass through four signal paths and separately enter the different fed elements 121. At this time, the phase shifters 115A to 115D disposed on the signal paths are adjusted with respect to phase, so that the directivity of the antenna device 120 can be controlled.

By contrast, radio-frequency signals received by the fed elements 121 are communicated through four different signal paths and combined together by the signal combiner and splitter 116. The combined receive signal is down-converted by the mixer 118, amplified by the amplifier circuit 119, and transferred to the BBIC 200.

The RFIC 110 is formed as, for example, a one-chip integrated-circuit component having the circuit configuration described above. Alternatively, in the RFIC 110, the particular devices (the switches, the power amplifier, the low-noise amplifier, the attenuator, and the phase shifter) corresponding to each of the fed elements 121 may be formed as a one-chip integrated-circuit component corresponding to each of the fed elements 121.

(Antenna Module Structure)

Figure 2:
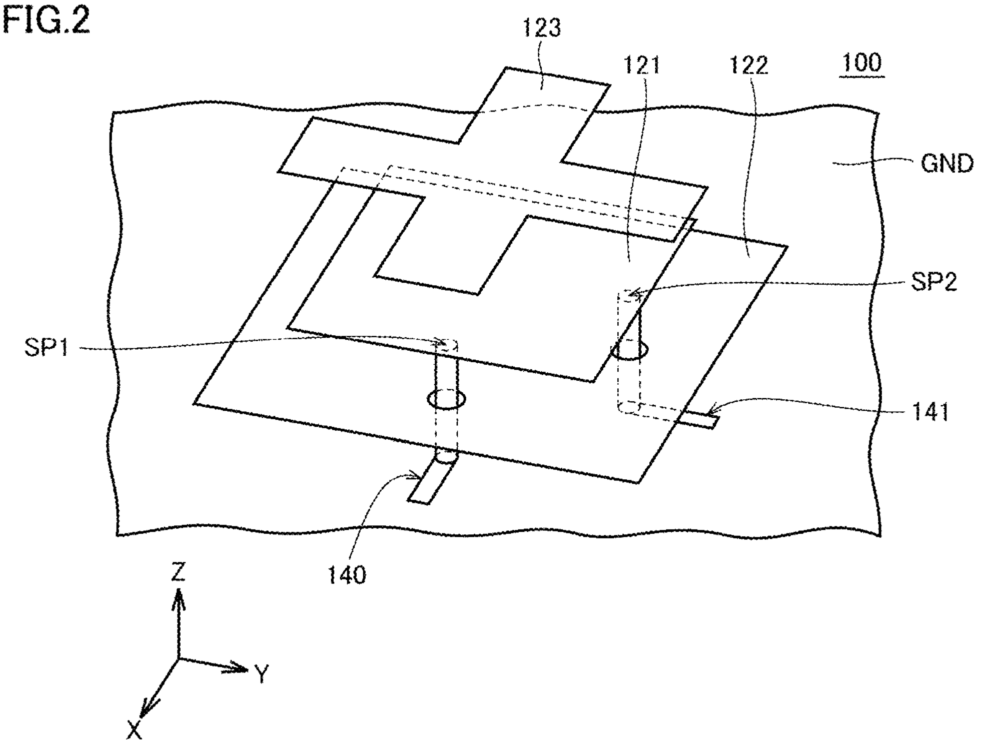
FIG. 2 is an exterior perspective view of the antenna module according to the first embodiment.
Figure 3:
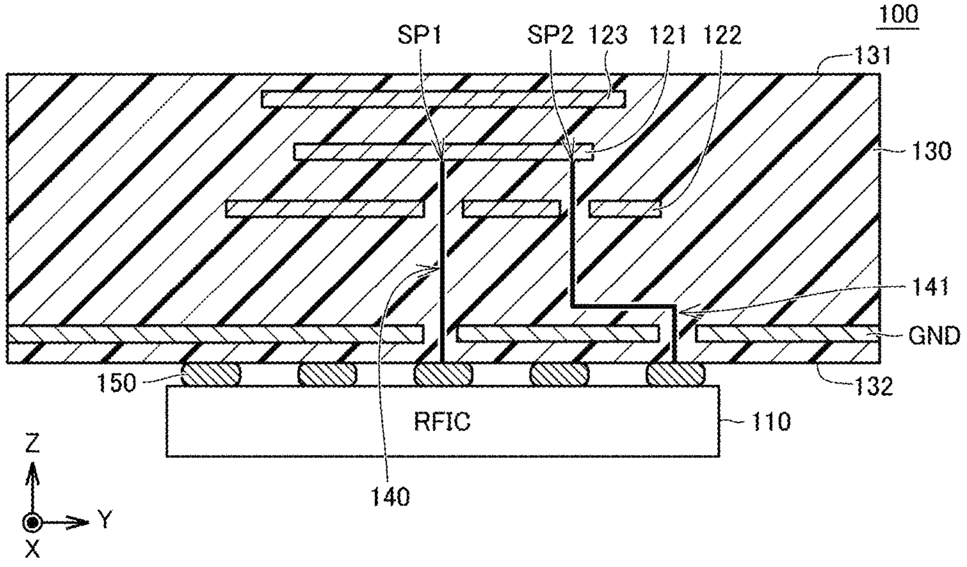
FIG. 3 is a sectional perspective view of the antenna module according to the first embodiment.

Next, a structure of the antenna module 100 according to the first embodiment will be described in detail with reference to FIGS. 2 and 3. FIG. 2 is an exterior perspective view of the antenna module 100. FIG. 3 is a sectional perspective view of the antenna module 100.

Referring to FIGS. 2 and 3, the antenna module 100 includes, in addition to the fed element 121 and the RFIC 110, unfed elements 122 and 123, a dielectric substrate 130, feed lines 140 and 141, and a ground electrode GND. In the following description, the forward direction of the Z axis in the drawings may be referred to as upper, and the reverse direction may be referred to as lower. In FIG. 2, the dielectric substrate 130 is not illustrated so that the internal structure can be easily viewed.

The dielectric substrate 130 may be, for example, a low temperature co-fired ceramics (LTCC) multilayer substrate, a multilayer resin substrate formed by stacking a plurality of layers made of a resin such as epoxy or polyimide, a multilayer resin substrate formed by stacking a plurality of resin layers made of a liquid crystal polymer (LCP) having a relatively low permittivity, a multilayer resin substrate formed by stacking a plurality of resin layers made of a fluorocarbon resin, or a multilayer ceramic substrate made of a ceramic other than LTCC. The dielectric substrate 130 does not necessarily have a multilayer structure and may be a single-layer substrate.

When the dielectric substrate 130 is viewed in a plan view in the normal direction (Z-axis direction), the dielectric substrate 130 is rectangular. The ground electrode GND is disposed at a layer on a lower surface 132 side of the dielectric substrate 130. The plate-like unfed element 123 is disposed facing the ground electrode GND on an upper surface 131 of the dielectric substrate 130 or at an inner layer on an upper surface 131 side of the dielectric substrate 130. The plate-like fed element 121 is disposed at a layer between the unfed element 123 and the ground electrode GND. The plate-like unfed element 122 is disposed at a layer between the fed element 121 and the ground electrode GND. When the dielectric substrate 130 is viewed in a plan view, a footprint of the fed element 121 and footprints of the unfed elements 122 and 123 at least partially overlap. In other words, from the upper surface 131 of the dielectric substrate 130, the unfed element 122, the fed element 121, the unfed element 123, and the ground electrode GND are stacked in the order presented.

The RFIC 110 is mounted on the lower surface 132 of the dielectric substrate 130 with the solder bumps 150 interposed between the RFIC 110 and the dielectric substrate 130. The RFIC 110 may be coupled to the dielectric substrate 130 by a multi-pole connector instead of solder joints.

The fed element 121 and the unfed element 122 are each formed in a substantially square shape when the dielectric substrate 130 is viewed in a plan view. The unfed element 122 is larger in size than the fed element 121. Thus, the resonant frequency of the unfed element 122 is lower than the resonant frequency of the fed element 121.

A radio-frequency signal is supplied from the RFIC 110, communicated through the feed line 140 extended through the ground electrode GND, and consequently transferred to a feed point SP1 of the fed element 121. The feed point SP1 is offset from the center (intersection point of diagonal lines) of the fed element 121 in the forward direction of the X axis in FIG. 2. The radio-frequency signal corresponding to the resonant frequency of the fed element 121 is supplied to the feed point SP1, and accordingly, the fed element 121 emits a radio wave in a polarization direction (first polarization direction), that is, the X-axis direction.

Because the feed line 140 extends through the unfed element 122, when a radio-frequency signal corresponding to the resonant frequency of the unfed element 122 is supplied to the feed point SP1, the unfed element 122 emits a radio wave in a polarization direction, that is, the X-axis direction. This means that the antenna device 120 is a dual-band antenna device capable of outputting radio-frequency signals in two frequency bands.

Additionally, a radio-frequency signal is supplied from the RFIC 110, communicated through the feed line 141 extended through the ground electrode GND, and consequently transferred to a feed point SP2 of the fed element 121. The feed point SP2 is offset from the center of the fed element 121 in the forward direction of the Y axis in FIG. 2. The radio-frequency signal corresponding to the resonant frequency of the fed element 121 is supplied to the feed point SP2, and accordingly, the fed element 121 emits a radio wave in a polarization direction (second polarization direction), that is, the Y-axis direction. This means that the antenna device 120 is a dual-polarization antenna element capable of emitting two kinds of polarization waves.

Because the feed line 141 extends through the unfed element 122, when a radio-frequency signal corresponding to the resonant frequency of the unfed element 122 is supplied to the feed point SP2, the unfed element 122 emits a radio wave in a polarization direction, that is, the Y-axis direction.

When the unfed element 123 is viewed in a plan view in the normal direction, the unfed element 123 is formed in a cruciform shape by two crossing electrodes. One rectangular electrode extends in the X-axis direction, whereas the other rectangular electrode extends the Y-axis direction. This means that the two electrodes extend respectively in the two polarization directions.

The length of each electrode in the longitudinal direction is longer than a side of the fed element 121. When the unfed element 123 is viewed in a plan view in the normal direction, both end portions of each electrode extend outwards beyond the fed element 121. When the unfed element 123 is viewed in a plan view in the normal direction, the feed points SP1 and SP2 of the fed element 121 are positioned under the unfed element 123.

Suitably adjusting dimensions of the electrode in the longitudinal direction and the lateral direction can widen the frequency bandwidth of radio-frequency signals transmittable and receivable by the antenna device 120. The unfed element 123 is not necessarily formed in a cruciform shape and may be formed in a substantially square shape similarly to the fed element 121 and the unfed element 122.

In FIGS. 2 and 3, the conductors forming the radiating elements, electrodes, and vias constituting the feed lines are made of a metal mainly containing aluminum (Al), copper (Cu), gold (Au), silver (Ag), or an alloy thereof.

Usually, it is desirable that an antenna module emits radio waves in a wide frequency band from radiating elements (fed and unfed elements). One method for expanding the frequency band is providing a stub in a feed line. In this case, when the antenna module is viewed in a plan view, the stub often extends beyond the radiating element. As a result, the antenna module needs a larger area for the stub. In particular, the dual-band dual-polarization antenna module as described above needs many stubs. Thus, in the case of an array antenna formed by an array of a plurality of radiating elements, the total size of the antenna module is large, which may hinder the miniaturization of devices.

Accordingly, in the first embodiment, the dual-band dual-polarization antenna module has a structure formed by stacking an unfed element in the direction in which radio waves are emitted, so that the frequency band can be expanded. When the dielectric substrate is viewed in a plan view, the unfed element overlaps a fed element and another unfed element configured to emit radio waves, and as a result, the area is smaller than if stubs are used. This can suppress an increase in the size of the antenna module. Additionally, forming the unfed element in a cruciform shape by two parts extending in two polarization directions facilitates impedance matching, which can further expand the frequency band.

Figure 4:
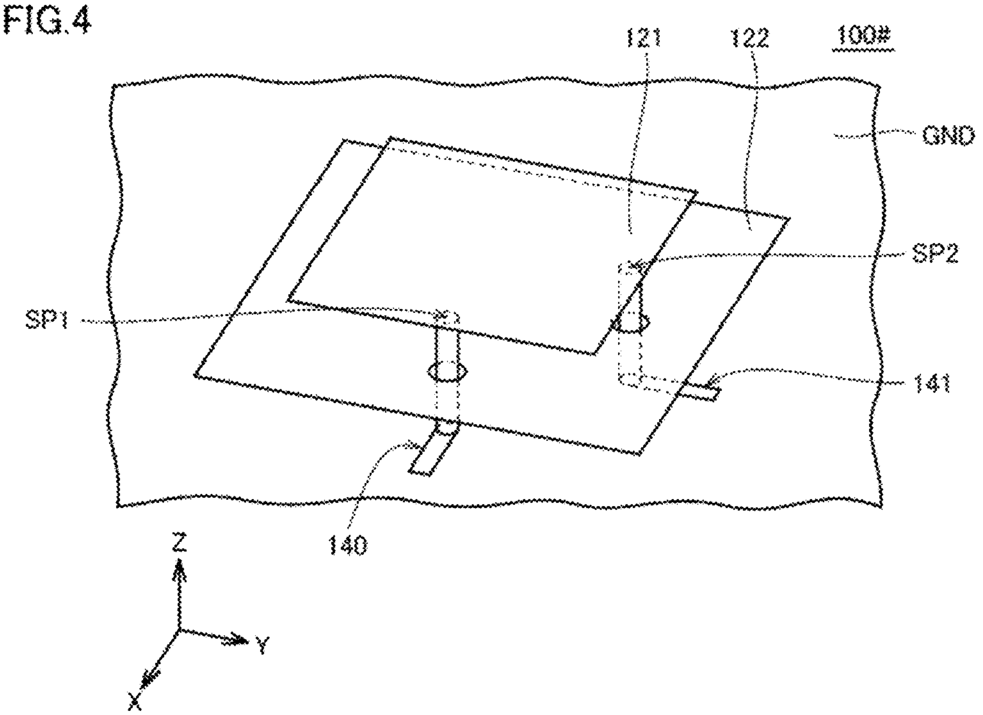
FIG. 4 is an exterior perspective view of an antenna module according to a comparative example.

FIG. 4 is an exterior perspective view of an antenna module 100# according to a comparative example. The antenna module 100# is structured by excluding the cruciform unfed element 123 from the structure of the antenna module 100. Regarding FIG. 4, redundant descriptions of elements identical to the elements in FIGS. 2 and 3 are not repeated.

Figure 5:
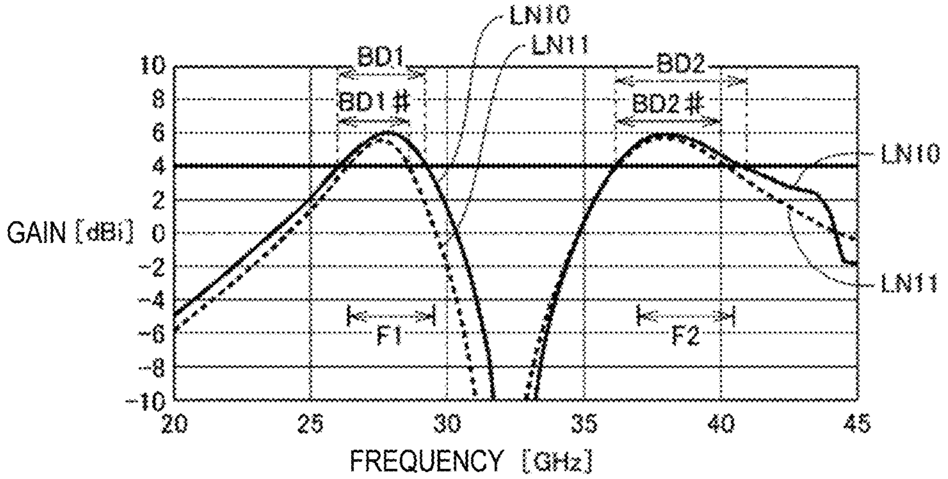
FIG. 5 illustrates the gain in the first embodiment and the gain the comparative example.

FIG. 5 is a diagram for explaining the antenna gain of the antenna module 100# of the comparative example and the antenna gain of the antenna module 100 of the first embodiment. In FIG. 5, the horizontal axis indicates frequency, and the vertical axis indicates antenna gain. In FIG. 5, F1 indicates the frequency band of radio waves emitted by the unfed element 122, and F2 indicates the frequency band of radio waves emitted by the fed element 121. A solid line LN1 represents the antenna gain in the case of the antenna module 100 of the first embodiment. A dashed line LN11 represents the antenna gain in the case of the antenna module 100# of the comparative example.

Referring to FIG. 5, within the lower frequency band F1, the antenna module 100 of the first embodiment can achieve an antenna gain of 4 dBi in a frequency bandwidth BD1, which is wider than a frequency bandwidth BD1# of the comparative example. Similarly, also within the higher frequency band F2, the antenna module 100 of the first embodiment can achieve an antenna gain of 4 dBi in a frequency bandwidth BD2, which is wider than a frequency bandwidth BD2# of the comparative example.

When radiating elements are stacked in the order as in the antenna module 100, the unfed element 123 mainly helps the fed element 121 facing the unfed element 123 to expand the frequency bandwidth. In the antenna module 100 of the first embodiment, when the unfed element 123 is viewed in a plan view in the normal direction, end portions of the cruciform unfed element 123 extend outwards beyond the fed element 121 to face the unfed element 122. The extending portions of the unfed element 123 expand the frequency bandwidth of the unfed element 122.

As described above, because in the first embodiment the cruciform unfed element 123 is provided on the forward side in the direction of emitting radio waves with respect to the fed element 121, a wider frequency bandwidth can be emitted without providing a stub in a feed line. As a result, when an array antenna is formed by using the antenna module, the antenna size can be reduced.

It should be noted that the "unfed element 123" and "unfed element 122" in the first embodiment respectively correspond to "first unfed element" and "second unfed element" in the present disclosure. The "feed line 140" and "feed line 141" in the first embodiment respectively correspond to "first feed line" and "second feed line" in the present disclosure. The "ground electrode GND" in the first embodiment corresponds to "first ground electrode" in the present disclosure.

Figure 6:
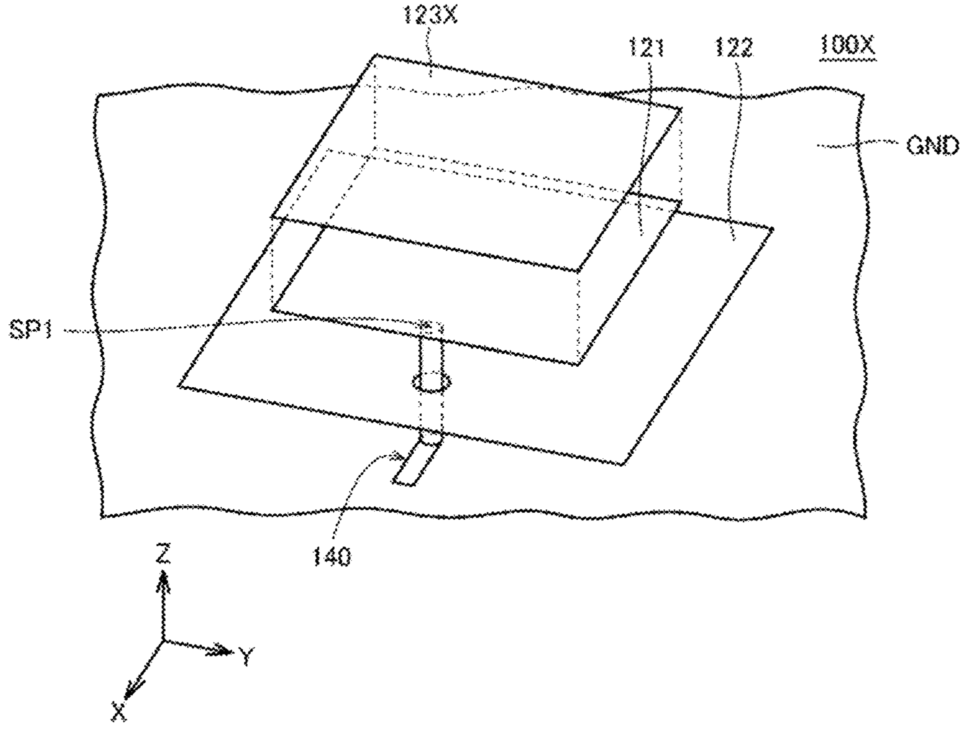
FIG. 6 is an exterior perspective view of a single-polarization antenna module.

Although the first embodiment describes the case of a dual-band dual-polarization antenna module, the present disclosure can also be applied to a dual-band single-polarization antenna module such as an antenna module 100X illustrated in FIG. 6. In this case, an unfed element 123X disposed on an upper surface side of the dielectric substrate 130 is not necessarily formed in a cruciform shape and may be formed in a rectangular shape such as an oblong or substantially square shape.

(First Modification)

Figure 7:
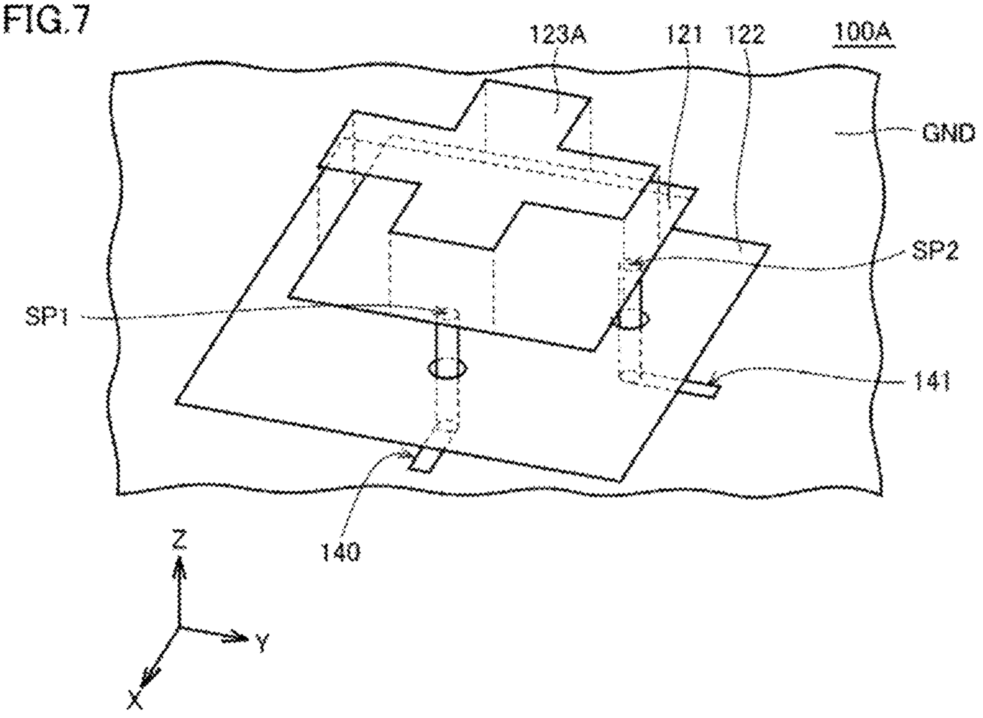
FIG. 7 is an exterior perspective view of an antenna module according to the first modification.

As described above, regarding the antenna module of the first embodiment, a description has been provided for the example in which end portions of a cruciform unfed element extend outwards beyond a fed element when the unfed element is viewed in a plan view in the normal direction. However, the end portions of the cruciform unfed element do not necessarily extend beyond the fed element. As in a sectional perspective view of an antenna module 100A according to a first modification illustrated in FIG. 7, when an unfed element 123A is viewed in a plan view in the normal direction, the cruciform unfed element 123A entirely coincide with the fed element 121.

In this case, the unfed element 123A is coupled to the fed element 121 via an electromagnetic field, the unfed element 123A is considered not to help widen the lower frequency band of radio waves emitted by the unfed element 122.

It should be noted that the "unfed element 123A" in the first modification corresponds to "first unfed element" in the present disclosure.

(Second Modification)

Figure 8:
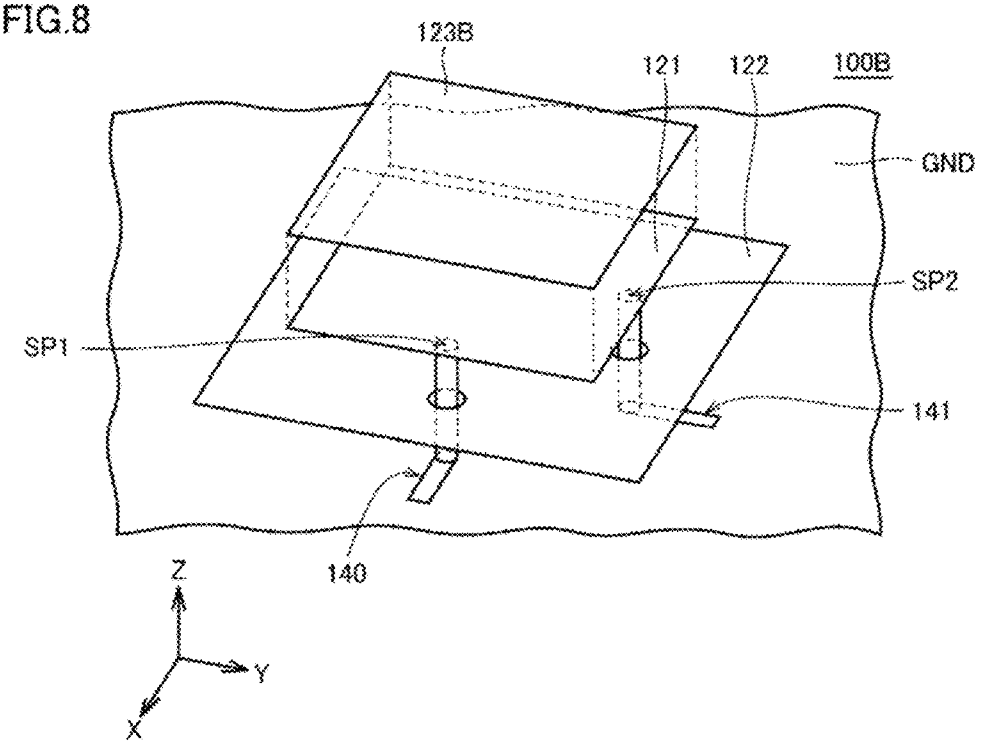
FIG. 8 is an exterior perspective view of an antenna module according to a second modification.

FIG. 8 is a sectional perspective view of an antenna module 100B according to a second modification. In the antenna module 100B, an unfed element 123B is formed in not a cruciform shape but a substantially square shape identical in size to the fed element 121. When the unfed element 123B is viewed in a plan view in the normal direction, the unfed element 123B and the fed element 121 coincide with each other.

Also with this structure, the unfed element 123B can widen the higher frequency band of radio waves emitted by the fed element 121.

It should be noted that the "unfed element 123B" in the second modification corresponds to "first unfed element" in the present disclosure.

Second Embodiment

A second embodiment describes a structure formed by controlling the route of feed lines for transferring radio-frequency signals to the fed element 121 so that the impedance of the fed element 121 for emitting radio waves and the impedance of the unfed element 122 for emitting radio waves can be controlled.

Figure 9:
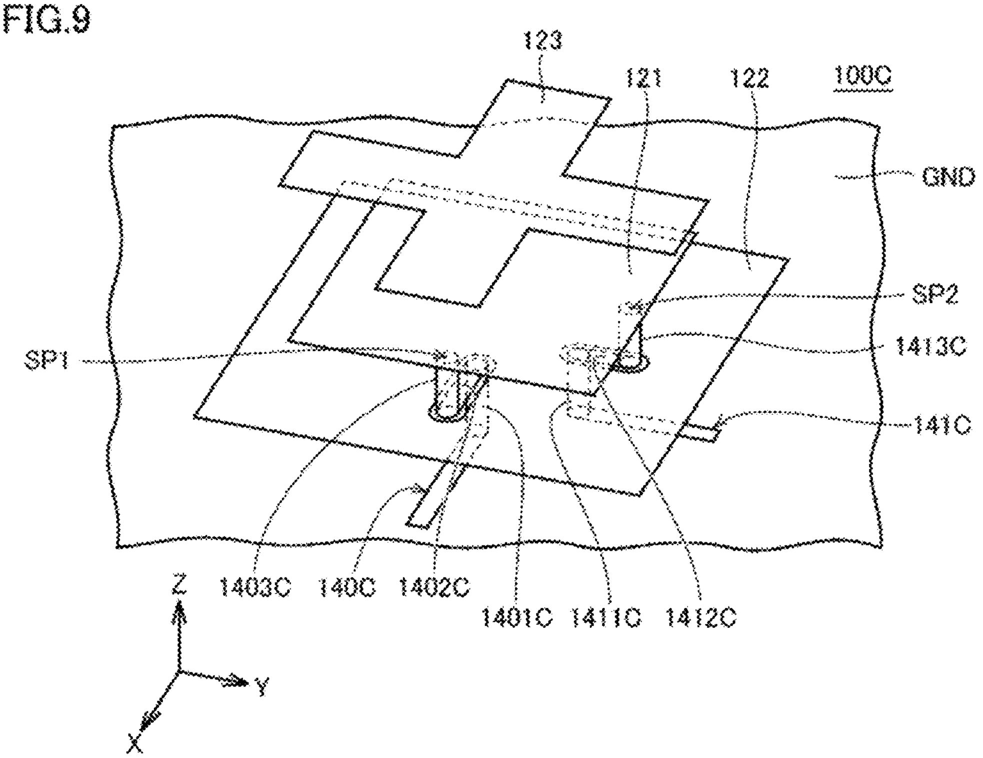
FIG. 9 is an exterior perspective view of an antenna module according to a second embodiment.
Figure 10:
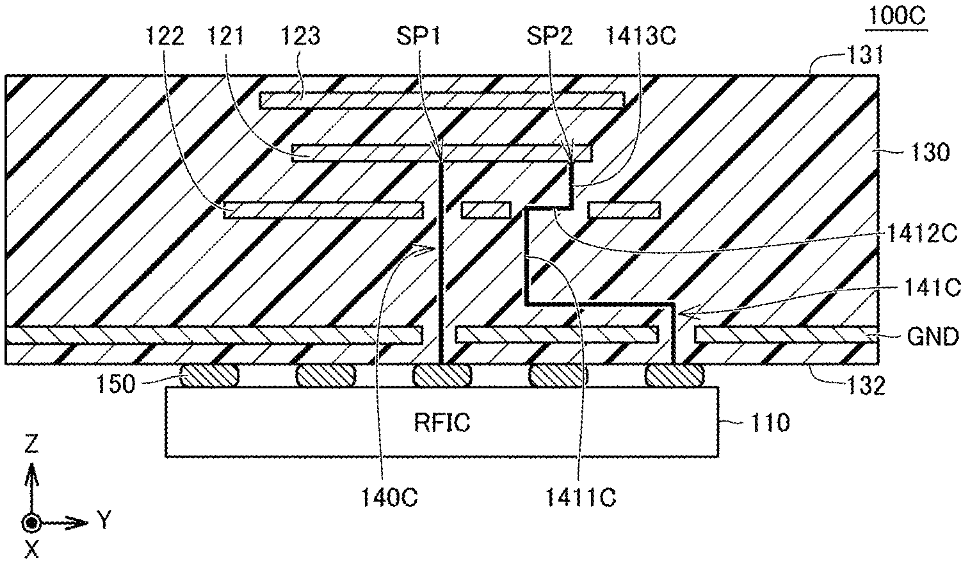
FIG. 10 is a sectional perspective view of the antenna module according to the second embodiment.

FIG. 9 is an exterior perspective view of an antenna module 100C according to the second embodiment. FIG. 10 is a sectional perspective view of the antenna module 100C according to the second embodiment. Referring to FIGS. 9 and 10, in the antenna module 100C, a feed line 140C for transferring a radio-frequency signal from the RFIC 110 to the fed element 121 firstly extends upwards from a ground electrode GND side along a via 1401C to a layer including the unfed element 122. The feed line 140C then extends along a wiring pattern 1402C with an offset in the polarization direction (X-axis direction) at the layer including the unfed element 122 and further extends upwards along a via 1403C to the feed point SP1 of the fed element 121. In other words, when the antenna module 100C is viewed in a plan view in the normal direction, the via 1401C, which extends from the ground electrode GND side to the unfed element 122, is positioned out of the via 1403C, which extends from the unfed element 122 to the fed element 121.

Similarly, the feed line 141C also extends upwards along a via 1411C from the ground electrode GND side to a layer including the unfed element 122, then extends along a wiring pattern 1412C with an offset in the polarization direction (Y-axis direction) at the layer, and further extends upwards along a via 1413C to the feed point SP2 of the fed element 121. In other words, when the antenna module 100C is viewed in a plan view in the normal direction, the via 1411C, which extends from the ground electrode GND side to the unfed element 122, is positioned out of the via 1413C, which extends from the unfed element 122 to the fed element 121.

It is known that, when the feed point of the fed element 121 connected to the feed line is provided at a position different from the position at which the feed line extends through the unfed element 122, the impedance of the fed element 121 and the impedance of the unfed element 122 differ from each other, which changes antenna characteristics. Thus, by controlling the route of the feed lines from the RFIC 110 to the fed element 121, the position at which the feed line extends through the unfed element 122 and the position at which the feed line is connected to the fed element 121 are appropriately set to individually control the impedance of the fed element 121 and the impedance of the unfed element 122, and as a result, it is possible to widen the bandwidth or improve antenna gain.

Although the above description of the antenna module 100C explains the example in which the wiring patterns 1402C are 1412C are formed at the layer including the unfed element 122, the wiring patterns 1402C and 1412C may be formed at a layer between the fed element 121 and the unfed element 122 when the position at which the feed line extends through the unfed element 122 and the position at which the feed line is connected to the fed element 121 can be individually controlled.

It should be noted that the "feed line 140C" and "feed line 141C" in the second embodiment correspond to "first feed line" and "second feed line" in the present disclosure. The "via 1411C" and "via 1413C" of the "feed line 141C" correspond to "first via" and "second via" in the present disclosure. The "via 1401C" and "via 1403C" of the "feed line 140C" correspond to "third via" and "fourth via" in the present disclosure.

(Third Modification)

The above descriptions of the antenna modules explain the example in which the wiring pattern of the feed line extending in a layer is formed as a microstrip line having one surface positioned facing the ground electrode GND.

Figure 11:
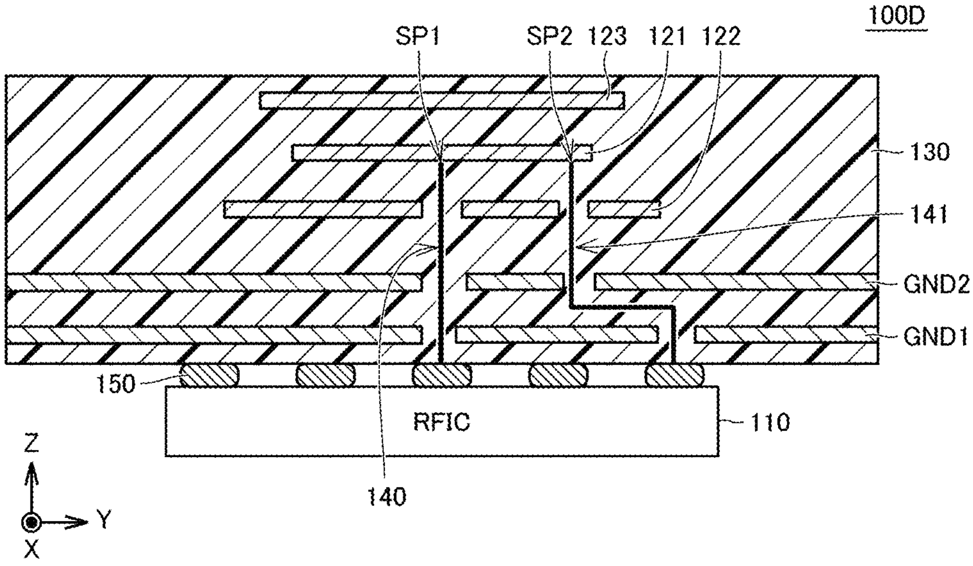
FIG. 11 is a sectional perspective view of an antenna module according to a third modification.

In an antenna module 100D of a third modification illustrated in FIG. 11, the wiring pattern of the feed line 140 and the wiring pattern of the feed line 141 are formed as strip lines extending through the two ground electrodes GND1 and GND2.

By forming the wiring patterns of the feed lines as strip lines as described above, it is possible to reduce coupling between radiating elements (fed and unfed elements) and the feed lines, and as a result, noise characteristics become better than if microstrip lines are used.

It should be noted that the "ground electrode GND1" and "ground electrode GND2" in the third modification respectively correspond to "first ground electrode" and "second ground electrode" in the present disclosure.

(Fourth Modification)

A fourth modification describes an example in which the wiring pattern of the feed line is formed as a coplanar line at the same layer as the ground electrode GND.

Figure 12:
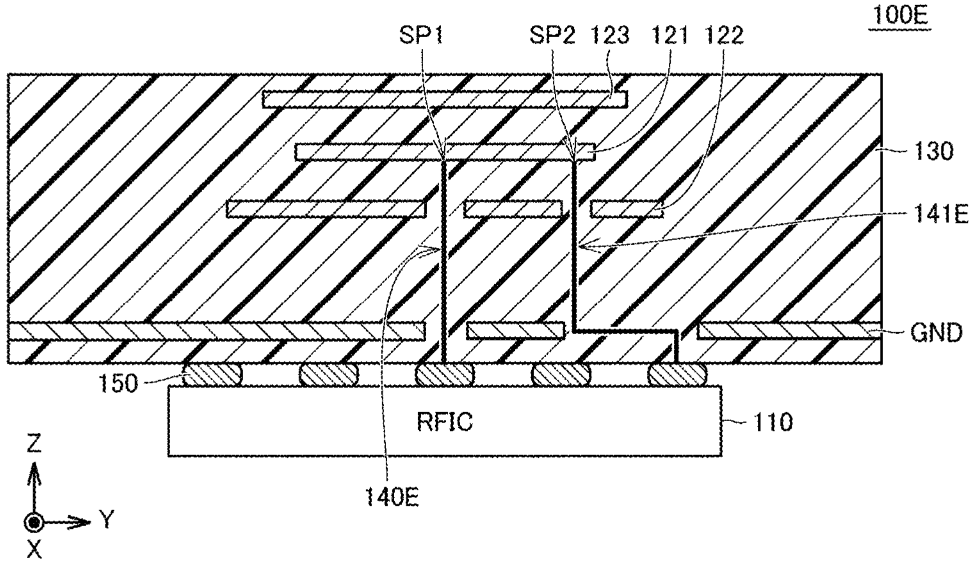
FIG. 12 is a sectional perspective view of an antenna module according to a fourth modification.
Figure 13:
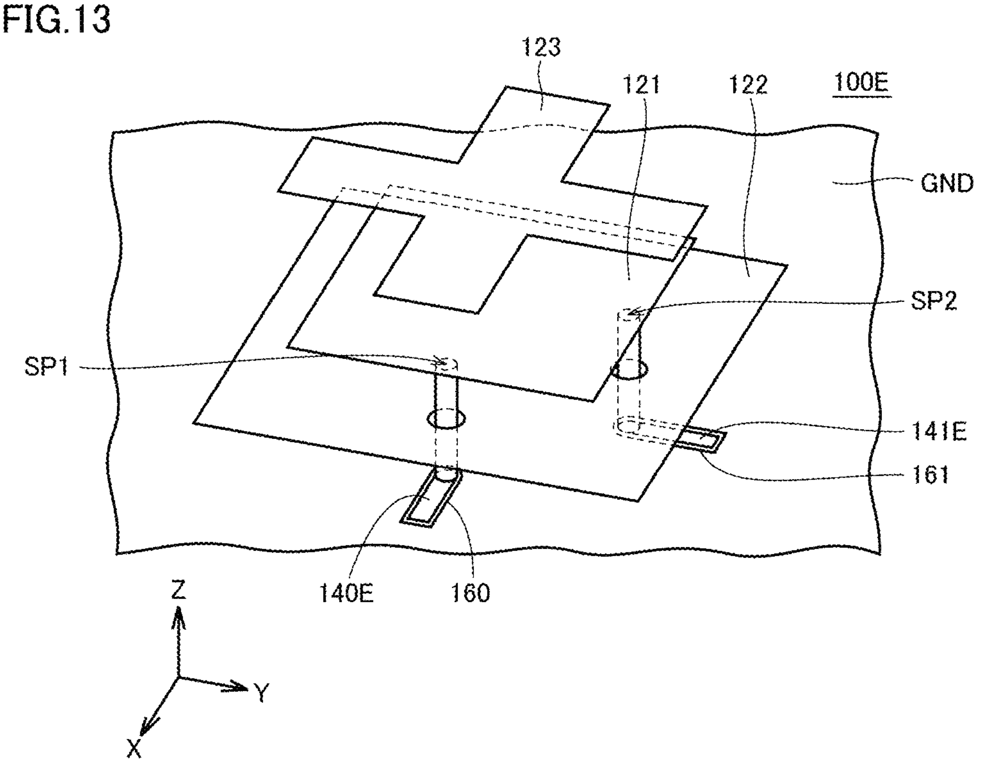
FIG. 13 is an exterior perspective view of the antenna module according to the fourth modification.

FIG. 12 is a sectional perspective view of an antenna module 100E according to the fourth modification. FIG. 13 is an exterior perspective view of the antenna module 100E. Referring to FIGS. 12 and 13, in the antenna module 100E, a feed line 140E firstly extends upwards along a via from the RFIC 110 to the layer including the ground electrode GND; the feed line 140E then extends with an offset along a slit 160 formed at the ground electrode GND by a wiring pattern and elongated in the polarization direction (X-axis direction); the feed line 140E further extends through the unfed element 122 along a via; and the feed line 140E is coupled to the feed point SP1 of the fed element 121.

Similarly, a feed line 141E firstly extends upwards along a via from the RFIC 110 to the layer including the ground electrode GND; the feed line 141E then extends with an offset along a slit 161 formed at the ground electrode GND by a wiring pattern and elongated in the polarization direction (Y-axis direction); the feed line 141E further extends through the unfed element 122 along a via; and the feed line 141E is coupled to the feed point SP2 of the fed element 121.

The transmission loss of a coplanar line is usually less than the transmission loss of a strip line and the transmission loss of a microstrip line. Hence, by forming the feed line as a coplanar line as in the antenna module 100E, it is possible to improve antenna gain while reducing transmission loss.

In the embodiments and modifications described above, the fed element 121 and the unfed element 122 may be the same size.

The embodiments and modifications describe the structure in which the part between the unfed element 123 (123A, 123B, 123X) and the fed element 121 is filled with a dielectric material, but a space may be formed between the unfed element 123 and the fed element 121 in the dielectric substrate. The unfed element 123 may be formed at a substrate or housing separated from the fed element 121, so that a space can be formed between the unfed element 123 and the fed element 121.

The embodiments disclosed herein should be considered as an example in all respects and not construed in a limiting sense. The scope of the present disclosure is indicated by not the above description of the embodiment but the claims and all changes which come within the meaning and range of equivalency of the claims are therefore intended to be embraced therein.

The invention claimed is:

1. An antenna module comprising:
a first ground electrode;
a planar-shaped first unfed element disposed facing the first ground electrode;
a planar-shaped fed element disposed between the first unfed element and the first ground electrode;
a planar-shaped second unfed element disposed between the fed element and the first ground electrode;
a first feed line extending through the second unfed element and configured to transfer a radio-frequency signal to the fed element; and
a second feed line that extends through the second unfed element and is configured to transfer the radio-frequency signal to the fed element, wherein
the first unfed element is formed in a cruciform shape when viewed in a plan view in a normal direction.

2. The antenna module of claim 1, wherein
the first unfed element extends outwards beyond the fed element when viewed in a plan view in the normal direction.

3. The antenna module of claim 1, wherein
the fed element is configured to emit a radio wave in a first polarization direction in accordance with the radio-frequency signal from the first feed line and emit a radio wave in a second polarization direction perpendicular to the first polarization direction in accordance with the radio-frequency signal from the second feed line.

4. The antenna module of claim 3, wherein
the first unfed element extends in the first polarization direction and the second polarization direction when viewed in a plan view in the normal direction.

5. The antenna module of claim 1, wherein
the second feed line includes a first via and a second via.

6. The antenna module of claim 5, wherein
when the antenna module is viewed in a plan view in the normal direction, the first via is different in position from the second via.

7. The antenna module of claim 6, wherein
the first via extends from a first ground electrode side to the second unfed element, and
the second via extends from the second unfed element to the fed element.

8. The antenna module of claim 1, wherein
the first feed line includes a first via and a second via.

9. The antenna module of claim 1, wherein
when the second unfed element is viewed in a plan view in a normal direction, the second unfed element is larger in size than the fed element.

10. The antenna element of claim 9, wherein
the fed element is configured to emit a radio wave in a first frequency band, and
the second unfed element is configured to emit a radio wave in a second frequency band lower than the first frequency band.

11. The antenna module of claim 1, wherein
the first feed line includes a wiring pattern extending at a same planar layer as the first ground electrode.

12. The antenna module of claim 1, further comprising:
a feed circuit configured to supply the radio-frequency signal to the fed element.

13. An antenna module comprising:
a first ground electrode;
a planar-shaped first unfed element disposed facing the first ground electrode;

a planar-shaped fed element disposed between the first unfed element and the first ground electrode;

a planar-shaped second unfed element disposed between the fed element and the first ground electrode; and a first feed line extending through the second unfed element and configured to transfer a radio-frequency signal to the fed element, wherein the first unfed element is formed in a cruciform shape when viewed in a plan view in a normal direction, the first feed line includes a first via and a second via, and when the antenna module is viewed in a plan view in a normal direction, the first via is different in position from the second via.

14. The antenna module of claim 13, wherein the first via extends from a first ground electrode side to the second unfed element, and the second fourth via extends from the second unfed element to the fed element.

15. An antenna module comprising:

a first ground electrode;

a planar-shaped first unfed element disposed facing the first ground electrode;

a planar-shaped fed element disposed between the first unfed element and the first ground electrode;

a planar-shaped second unfed element disposed between the fed element and the first ground electrode;

a second ground electrode disposed between the second unfed element and the first ground electrode; and a first feed line extending through the second unfed element and configured to transfer a radio-frequency signal to the fed element, wherein the first unfed element is formed in a cruciform shape when viewed in a plan view in a normal direction, and the first feed line includes a wiring pattern extending at a layer between the first ground electrode and the second ground electrode.

* * * * *